J. L. STROPES.

Improvement in End-Gates for Wago

No. 4,631. Reissued No.

Witnesses
R. B. Curtis,
Villette Anderson

Inventor
J. L. Stropes,
Chipman & Somers & Co
Attys.

UNITED STATES PATENT OFFICE.

JEREMIAH L. STROPES, OF BLOOMFIELD, INDIANA.

IMPROVEMENT IN END-GATES FOR WAGONS.

Specification forming part of Letters Patent No. 117,014, dated July 11, 1871; reissue No. 4,631, dated November 7, 1871.

*To all whom it may concern:*

Be it known that I, JEREMIAH L. STROPES, of Bloomfield, in the county of Greene and State of Indiana, have invented certain new, useful, and valuable Improvements in End-Gates for Wagons; and I do hereby declare that the following is a full, clear, and exact description of the construction and operation of the same, reference being had to the accompanying drawing, in which—

Figure 1:
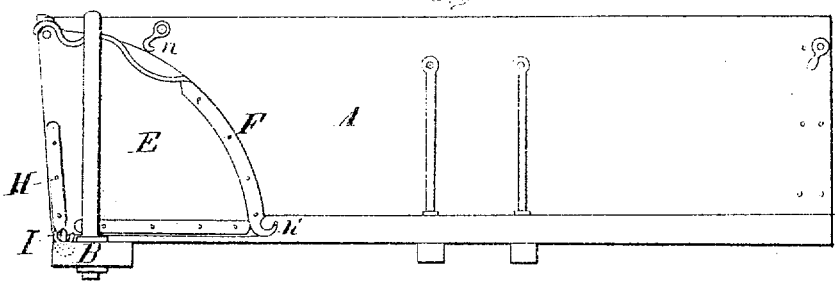
Figure 2:
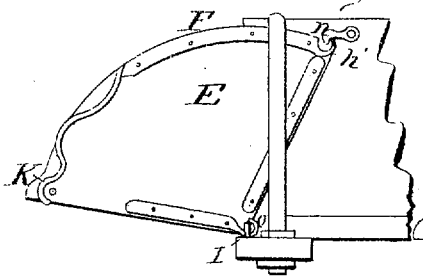
Figure 3:
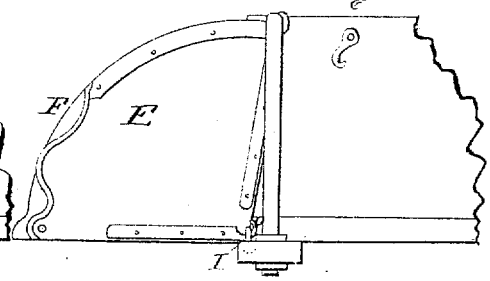
Figure 4:
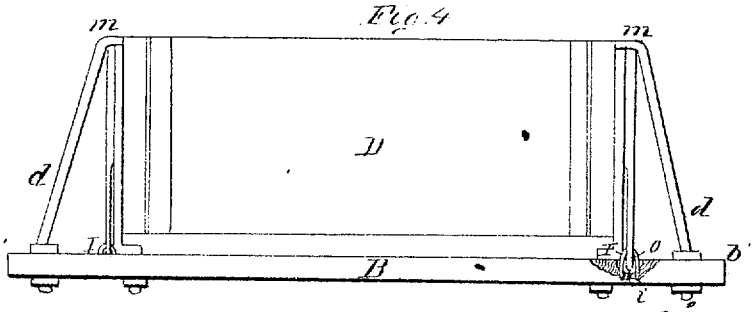

Figure 1 is a side view of a common farm-wagon, showing my invention. Figs. 2, 3, and 4 are details.

My invention has relation to end-gates for wagons or other vehicles; and the novelty consists in the construction and arrangement of devices and parts, as hereinafter described, whereby the end-gate is adapted to be supported at different positions, and is also rendered easily removable, when desired.

In the accompanying drawing, A represents an ordinary wagon-body; B, the bed-sill on the under side and at the rear end of the body. This bed-sill has projecting ends $b'$, to which brace-rods $d$ are secured by means of nuts on the under side of the sill. These braces are riveted in grooves on the inside of the wagon-body, or to the plane interior surface, as may be desired; and are thence brought over the top edges of the wagon-sides, projected out a short distance, turned down obliquely, and secured to the sill B, as before described. D represents the end-gate, provided with the triangular metallic side pieces E. This end-gate rests upon the sill B, which projects slightly beyond the rear end of the wagon sides and floor, so that when the gate is up its lower edge will be flush and even with said sill, as seen in Fig. 1 of the drawing. The sides of the wagon-body are cut with oblique ends, and are longer at the top than at the bottom. The side pieces E are cut obliquely on that edge which extends from the hinge or sill to the hook $h'$, so that when the end-gate is raised said oblique edges shall be exactly horizontal, and present a finished appearance; and that when the end-gate is lowered the part of said plates from which the hooks $h'$ project shall overlap the sides of the wagon-body, and thereby increase the security of the end-gate from lateral displacement, as well as provide for the fastening. F represents steel springs or bars attached to the outer-surfaces of the plates E. Each of these springs is provided with a stop-hook, $h'$, at its lower end, and a spring catch, K', at its upper end. When the end-gate is down on a level with the floor of the wagon-body the stop-hooks $h'$ come in contact with and catch on the shoulders $m$ of the braces $d$, and so support the end-gate. When the gate is raised the spring-latch K' engages automatically with the shoulder $m$ and serves to hold the gate up. $n$ represents a dog or pawl pivoted to the side of the wagon-body in such a position that it may be brought into contact with the stop-hook $h'$, and hold the end-gate at an angle, as shown in Fig. 2. H represents a bar riveted to the side and rear part of each of the side-pieces E. Its lower end is provided with a hook, O, which is coupled to a staple, I, secured to the sill B, and serves as a hinge for the end-gate to turn on. The staples I are raised above slight recesses $i$ made in the sill B, through which the hooks O pass and work. By means of these recesses the end-gate is secured from displacement at the bottom, the hooks O being forced down by the pressure of the curved edges of the plates E acting as cams against the shoulders $m$ as the gate is raised. The upper angle or end of these plates is constructed with projections L, which are riveted to the ends of the gate and serve to complete its finish.

I claim as my invention—

1. The combination of the braces $d$, cross-bar B, and grate D, constructed with cam-sides E, and having spring-latches K attached to said cams, substantially as specified, and for the purposes set forth.

2. The combination, with a wagon-body having the recessed transverse bar B with staples I and braces $d$, of the gate D provided with the latches K, side-pieces E, and hooks $h'$, substantially as specified.

3. The transverse sill-bar B, constructed with the recesses $i$ to receive the hooks O when the end-gate is pressed down, substantially as specified.

4. The improved end-gate for wagons, having its cam-sides E cut obliquely from the hooks O to the hooks $h'$, substantially as and for the purpose specified.

5. The braces $d$, constructed with the shoulders $m$ adapted to press down the end-gate D, as and for the purpose set forth.

6. The braced catch $d$ $m$, operating in connection with the undulating spring-latch K of the end-gate D, substantially as specified.

In testimony that I claim the above I have hereunto subscribed my name in the presence of two witnesses.

JEREMIAH L. STROPES.

Witnesses:
FRANK L. EDWARDS,
CHRISTOPHER LEAVITT. (31)